UNITED STATES PATENT OFFICE.

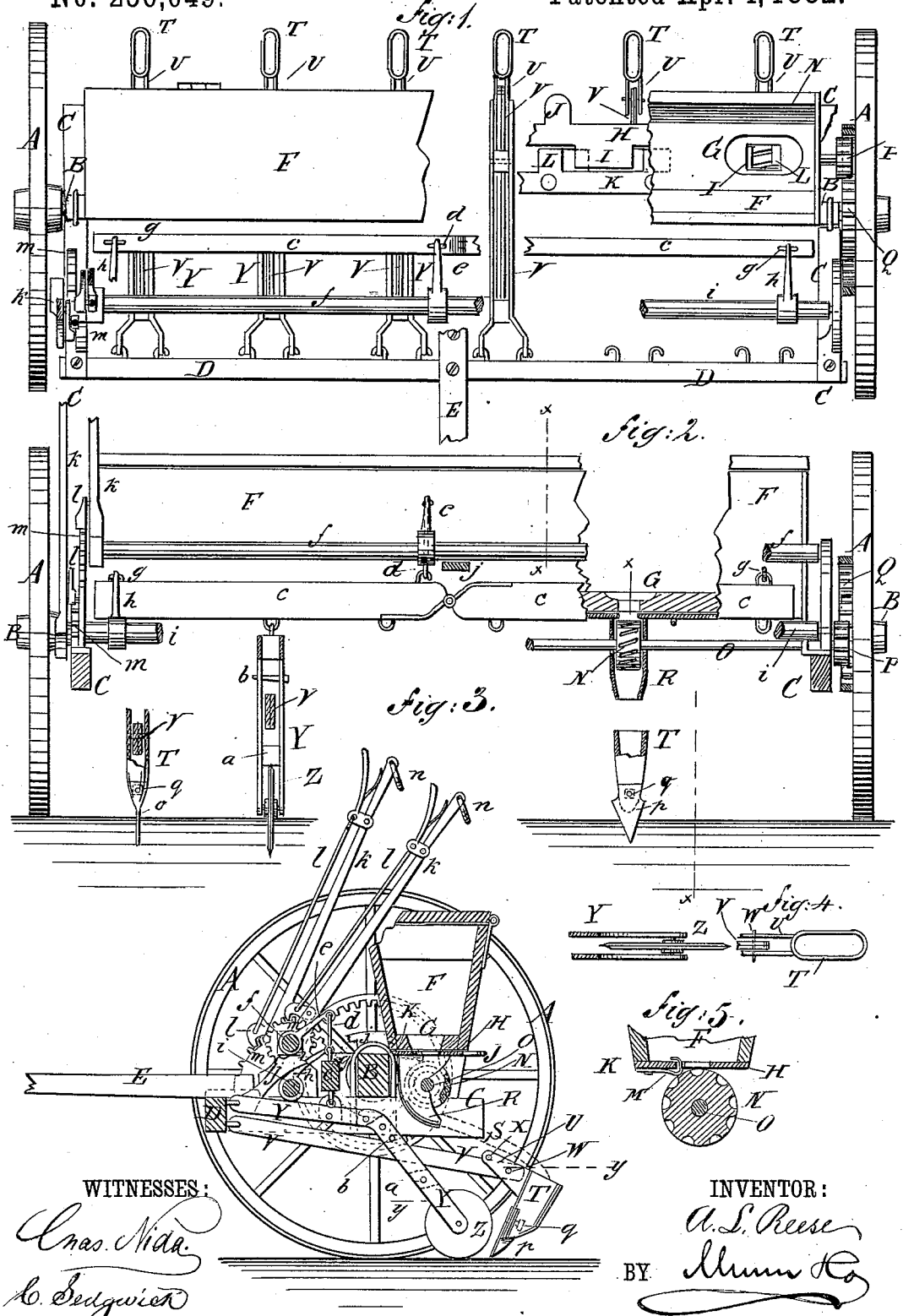

ABRAM L. REESE, OF CHASE, KANSAS.

WHEAT-DRILL.

SPECIFICATION forming part of Letters Patent No. 256,049, dated April 4, 1882.

Application filed November 26, 1881. (Model.)

*To all whom it may concern:*

Be it known that I, ABRAM LINCOLN REESE, of Chase, in the county of Rice and State of Kansas, have invented certain useful Improvements in Wheat-Drills, of which the following is a full, clear, and exact description.

Reference is to be had to the accompanying drawings, forming part of this specification, in which similar letters of reference indicate corresponding parts in all the figures.

Figure 1 is a plan view of my improvement, parts being broken away. Fig. 2 is a front elevation of the same, parts being broken away. Fig. 3 is a sectional side elevation of the same, taken through the line $x\,x\,x$, Fig. 2. Fig. 4 is a plan view of a hoe and colter, the draw-bars being shown in section, taken through the line $y\,y$, Fig. 3. Fig. 5 is a sectional elevation of gage-slide, cut-off spring, and seed-dropping wheel.

The object of this invention is to adapt wheat-drills to work on uneven and weedy ground and promote convenience in controlling the operating parts of the drills.

A are the wheels, to the axle B of which, near its ends, are attached the middle parts of two side bars, C.

To the forward ends of the side bars, C, are attached the ends of a cross-bar, D, to the center of which is attached the tongue E.

To the rearwardly-projecting parts of the side bars, C, are attached supports for the seed-box F, which supports may be the downwardly-projecting ends of the said seed-box F. By this arrangement an angular space is formed between the bottom of the seed-box F and the rear side of the axle B to receive the seed-dropping mechanism. Through the bottom of the seed-box F are formed apertures G for the discharge of the seed.

In keepers attached to the bottom of the seed-box F slides a plate, H, which is placed beneath the rear part of the said bottom and has projections I upon its forward edge in such positions that they can be made to cover the discharge-apertures of the seed-box wholly or partly, or to leave the said apertures uncovered by moving the said plate longitudinally. The plate H is moved by means of an arm, J, or a lever formed upon or connected with the said plate.

To the forward part of the bottom of the seed-box F is attached a plate, K, which has projections L upon its rear edge, between the projections I of the gage-plate H, so as to limit the movements of the said gage-plate.

To the bottom of the seed-box F, or to the plate K at the rear edge of each discharge-aperture G, is attached a spring, M, to rest against the face of the seed-dropping wheel N and serve as a cut-off to prevent the said wheel from carrying out any more seed than enough to fill its seed-dropping recesses. The wheels N are secured to a shaft, O, which revolves in bearings attached to the side bars, C.

To one end of the shaft O is attached a small gear-wheel, P, the teeth of which mesh into the teeth of the internally-toothed gear-wheel Q, attached to the wheel A.

Each seed-dropping wheel N revolves in a guard spout or shield, R, from which the seed passes through a flexible guide-tube, S, to the hollow standard T, through which it passes to the ground.

Upon the forward side of the upper part of the standard T is formed an arm, U, which is slotted to receive the rear end of the draw-bar V, to which it is hinged by a pin, W. The standard T is held in position while at work by a wooden pin, X, which passes through the end of the arm U and rests against the upper edge of the draw-bar V. The pin W is made of sufficient strength to hold the standard T to its work under ordinary circumstances; but should the said standard strike an obstruction the pin W will break and allow the standard to swing to the rearward to prevent the plow from being broken. The forward end of the draw-bar V is hinged to the lower part of the rear side of the cross-bar D.

To the cross-bar D, directly above the forward ends of the plow draw-bars V, are hinged the forward ends of the draw-bars Y, to the rear ends of which are pivoted the circular colters Z. The draw-bars Y at or near their centers are bent downward, and are made double, or have their downwardly-inclined rear parts slotted to receive the plow draw-bars V. The downward movement of the plow draw-bars V is limited by a pin or block, $a$, secured to the colter draw-bar Y, and its upward movement is limited by a pin, $b$, attached to the said colter draw-bar Y a little below its angle. The pin $b$ also allows the plow draw-bar V to be held down to its work when operating upon hard ground. The colter draw-bars Y, a little in front of their angles, are hinged to the cross-bar $c$, which is made in two parts hinged to each other at their inner ends.

To the inner end of one of the parts of the cross-bar $c$ is hinged the lower end of a short connecting-rod, $d$, the upper end of which is hinged to the end of an arm, $e$, rigidly attached to the shaft $f$.

To the outer ends of the parts of the cross-bar $c$ are hinged the lower ends of two short connecting-rods, $g$, the upper ends of which are hinged to the arms $h$, rigidly attached to the shaft $i$. With this construction, by turning the shaft $f$ the middle plows and colters will be raised, and by turning the shaft $i$ the outer plows and colters will be raised, and by turning both shafts at the same time all the plows and colters will be raised, so that the plows and colters can be adjusted to uneven ground and to work at any desired depth in the ground. The middle part of the shaft $f$ is supported against being drawn downward by the weight of the plows and colters by a supporting-bar, $j$, the forward end of which is attached to the cross-bar D, and its rear end is attached to the hopper F or axle B. The ends of the shafts $f$ $i$ work in bearings attached to the side bars, C.

To one end of each of the shafts $f$ $i$ is rigidly attached a lever, $k$, by means of which the said shaft is turned, and which is held in any position into which it may be adjusted by a spring lever-pawl, $l$, connected with the said lever, and which engages with a catch-plate, $m$, attached to the side bar, C.

To the outer ends of the levers $k$ are hinged rings or links $n$, which can be turned over the levers of the pawls $l$ to hold the said pawls away from the catch-plates $m$ when it is desired to have the plows and colters work free.

When working in sod or hard ground narrow plows $o$ are attached to the lower ends of the hollow standards T, so that the said plows can follow in the tracks of the colters Z. When the soil is loose the narrow plows $o$ are detached and replaced with wider plows $p$. The plows $o$ $p$ are secured in place by screws $q$ passing through the lower parts of the standards T from the rear side, and screwing into the said plows $o$ $p$.

Having thus fully described my invention, I claim as new and desire to secure by Letters Patent—

1. The combination, with the draw-bar V and pins H W, of the pivoted standard T, having slotted arm U, and the slotted draw-bars Y, having pins $a$ $b$, as and for the purpose specified.

2. The combination, with a cross-bar, $c$, made in two parts hinged together, of the hinged connecting-rod $d$, the shaft $f$, having arm $e$, the rods $g$, and the shaft $i$, having arms $h$, as and for the purpose specified.

3. In a wheat-drill, the combination, with the colter draw-bars Y, of the cross-bar $c$, made in two parts hinged to each other, the connecting-rods $d$ $g$, the arms $e$ $h$, the shafts $f$ $i$, and the levers $k$ $k$, substantially as herein shown and described, whereby the plows and colters can be adjusted to uneven ground, and can be raised from the ground, as set forth.

ABRAM LINCOLN REESE.

Witnesses:
ISAAC M. REESE,
SYDNEY REESE.